US 6,711,572 B2

(12) United States Patent
Zakharov et al.

(10) Patent No.: US 6,711,572 B2
(45) Date of Patent: Mar. 23, 2004

(54) FILE SYSTEM FOR DISTRIBUTING CONTENT IN A DATA NETWORK AND RELATED METHODS

(75) Inventors: Michael Zakharov, Ramat Gan (IL); Dmitri Barboy, Rehovat (IL); Leonid Kogan, Rehovot (IL); Leonid Siitilman, Tel Aviv (IL); Ilya Usvyatsky, Rehovot (IL)

(73) Assignee: XOSoft Inc., Cupertino, CA (US)

( * ) Notice: Subject to any disclaimer, the term of this patent is extended or adjusted under 35 U.S.C. 154(b) by 192 days.

(21) Appl. No.: 09/757,975

(22) Filed: Jan. 10, 2001

(65) Prior Publication Data

US 2002/0059245 A1 May 16, 2002

Related U.S. Application Data

(60) Provisional application No. 60/211,645, filed on Jun. 14, 2000.

(51) Int. Cl.[7] .............................. G06F 17/30; G06F 9/44
(52) U.S. Cl. .......................... 707/10; 707/203; 717/170
(58) Field of Search ............................ 707/1, 100, 10, 707/203, 205, 511; 709/200–201, 220, 224; 717/170

(56) References Cited

U.S. PATENT DOCUMENTS

| 4,954,941 A | 9/1990 | Redman |
| 5,155,837 A | 10/1992 | Liu et al. |
| 5,274,808 A | 12/1993 | Miyao et al. |
| 5,359,730 A | 10/1994 | Marron |
| 5,410,703 A | 4/1995 | Nilsson et al. |
| 5,421,017 A | 5/1995 | Scholz et al. |
| 5,495,612 A | 2/1996 | Hirayama et al. |

(List continued on next page.)

FOREIGN PATENT DOCUMENTS

| EP | 0 663 640 A1 | 7/1995 |
| WO | WO 94/25919 | 11/1994 |

OTHER PUBLICATIONS

International Search Report for PCT/US01/18888. Mailed Oct. 31, 2002.

(List continued on next page.)

*Primary Examiner*—Alford Kindred
(74) *Attorney, Agent, or Firm*—Victor F. Souto; Hale and Dorr LLP

(57) ABSTRACT

A file system for distributing content in a data network, includes a file replication and transfer system and a replicated file receiver system. The file replication and transfer system includes an interface file system which looks for changes made to contents of a file created and stored in an associated work file system; and a file system monitor communicatively associated with the interface filing system for monitoring events occurring with the interface file system and causing copies of the new files to be transferred over the data network to the replicated file receiver system. The interface file system also looks for changes made to the contents of files already stored in the work file system and creates an update file in a mirror file system if a change to the contents of a file stored in the work file system is observed by the interface file system. A collector file system communicatively associated with the mirror file system is provided for temporarily storing a copy of the update file. The replicated file receiver system includes a file construction system for constructing a new version of the file from a copy of the file and the update file; a receiver collector file system for storing the new version of the file; and a receiver interface file system for enabling work to be conducted with an old copy of the file if an open request for the file has been made prior to the construction of the new version of the file, and for enabling work to be conducted with the new version of the file if an open request for the file has been made after the notification that the new version of the file has been constructed.

40 Claims, 9 Drawing Sheets

U.S. PATENT DOCUMENTS

| | | | |
|---|---|---|---|
| 5,504,888 A | | 4/1996 | Iwamoto et al. |
| 5,513,351 A | | 4/1996 | Grantz |
| 5,555,380 A | * | 9/1996 | Suzuki ..................... 710/33 |
| 5,574,898 A | * | 11/1996 | Leblang et al. ............... 707/1 |
| 5,682,533 A | | 10/1997 | Siljestroemer |
| 5,764,992 A | | 6/1998 | Kullick et al. |
| 5,832,275 A | | 11/1998 | Olds |
| 5,991,809 A | | 11/1999 | Kriegsman |
| 2001/0028368 A1 | * | 10/2001 | Swartz et al. ............... 345/835 |
| 2002/0059245 A1 | * | 5/2002 | Zakharov et al. ............ 707/10 |

OTHER PUBLICATIONS

Baldini, Andrea, Marco Vespa, Guiseppe Marino, and Giancario Succi. Sep. 28, 1992. "Melogranus: The Design of a Large Scale Distributed Unix File System." vol. 11, pp. 63–68. International Conference on Computer Communication. Proceedings of the Conference. Amsterdam, The Netherlands.

\* cited by examiner

FILE SYSTEM FOR DISTRIBUTING CONTENT IN A DATA NETWORK AND RELATED METHODS

PROVISIONAL APPLICATIONS

This application claims the benefit of Provisional application 60/211,645 filed Jun. 14, 2000.

RELATED APPLICATIONS

Commonly-assigned, copending U.S. patent application, No. 09/439,980, entitled "Nonintrusive Update Of Files", filed Nov. 12, 1999.

FIELD OF THE INVENTION

This invention relates to data network systems, and more particularly to file system for distributing content in a data network and methods relating to the same.

BACKGROUND OF THE INVENTION

Data network usage is growing rapidly due, in part, to the ease of distributing content over the Internet and the World Wide Web (the "Web"), which has been simplified by the emergence of the Hypertext Markup Language ("HTML") and the Hypertext Transfer Protocol ("HTTP"). Increased data network usage is also due to recent advances in networking technology, which provide ever-increasing storage capacity for content providers, and ever-increasing connection bandwidth for end users.

The Internet is an internetwork of networks, routers, backbones, and other switches and connections that separate a source of content from a user. Providing content from a single source to a single user becomes complex for a large, distributed network such as the Internet. Responding to requests from numerous users, who may be widely geographically distributed, and who may present widely varying traffic demands over time, becomes very complex. Inadequate management of network resources may result in the sluggish performance that is familiar to Internet users as slow page loading or outright failure of a request to a server.

One approach to this difficulty is to provide "mirror sites," which are content servers that supply identical content on one or more sites associated with an original content provider. However, mirror sites do not function well in highly dynamic environments, where frequent content changes require frequent mirror updates. Mirror sites are particularly deficient in environments where there are small changes to large files, since there is no efficient mechanism for transmitting incremental file changes to mirrors.

Accordingly, a system and/or method is still needed for efficiently distributing content in a data network. Such a system should be scalable to the Internet and transparent to users and content providers.

SUMMARY OF THE INVENTION

According to one aspect of the invention, a file system for distributing content in a data network, comprises a file replication and transfer system and a replicated file receiver system. The file replication and transfer system includes an interface file system which looks for changes made to contents of a file created and stored in an associated work file system. A file system monitor is communicatively associated with the interface filing system monitors events occurring with the interface file system and causes copies of the new files to be transferred over the data network to the replicated file receiver system.

According to another aspect of the invention, the interface file system looks for changes made to the contents of files already stored in the work file system and creates an update file in a mirror file system if a change to the contents of a file stored in the work file system is observed by the interface file system.

According to a further aspect of the invention, a collector file system communicatively associated with the mirror file system can be provided for temporarily storing a copy of the update file.

According to a further aspect of the invention, the replicated file receiver system includes a file construction system for constructing a new version of the file from a copy of the file and the update file.

According to a further aspect of the invention, the replicated file receiver system further includes a receiver collector file system for storing the new version of the file.

According to a further aspect of the invention, the replicated file receiver system further includes a receiver interface file system for enabling work to be conducted with the copy of the file if an open request for the copy of the file has been made prior to the construction of the new version of the file, and for enabling work to be conducted with the new version of the file if an open request for the copy of the file has been made after the notification that the new version of the file has been constructed.

According to a further aspect of the invention, a method for distributing content in a data network comprises creating an update file which records changes made to contents of a file stored in a work file system; generating a notification that the at least one change has been made to the contents of the file stored in the work file system, the notification indicating that the update file reflects all the changes of a version of the file; and distributing the update file over the data network to a receiver work file system.

According to a further aspect of the invention, a method for distributing content in a data network, comprises looking for changes made to contents of a file stored in a work file system; creating an update file which records only changes made to the contents of the file stored in the work file system; and distributing the update file over the data network to a receiver work file system; wherein the looking and creating steps are performed in a kernel mode.

According to a further aspect of the invention, a method for distributing content in a data network, comprises creating and storing a file in a work file system; generating a notification that the file has been created and stored in the work file system; and distributing a copy of the file over the data network to a receiver work file system.

According to a further aspect of the invention, a method for distributing content in a data network, comprises looking for files created and stored in a work file system; and distributing copies of the files over the data network to a receiver work file system operating at a second location; wherein the looking step is performed in a kernel mode.

BRIEF DESCRIPTION OF THE DRAWINGS

The advantages, nature, and various additional features of the invention will appear more fully upon consideration of the illustrative embodiments now to be described in detail in connection with accompanying drawings wherein.

DETAILED DESCRIPTION OF THE INVENTION

The file system of the present invention, as described with reference to following illustrative embodiments, is especially applicable to data networks such as the Internet. It should be understood, however, that the file system described herein may be suitably adapted to any other data network used for distributing content, including wide area networks, metropolitan area networks, virtual private networks, and the like. The file system of the present invention is particularly applicable to those environments requiring distribution of large amounts of data that may be changed from time to time. Furthermore, the file system of the present invention can be adapted for use with virtually any conventional operating system including but not limited to Microsoft Windows 95, Microsoft Windows NT, or Unix and its variants.

As used herein, the term content can be any media that may be stored in a digital form, including text, data files, program files, application documents such as word processing or spread sheet documents, still or moving graphical images, sound files, applications, applets, HTML documents, DHTML documents, XML documents, forms, or any combination of these. Content may also be real-time media such as streaming media.

Figure 1:
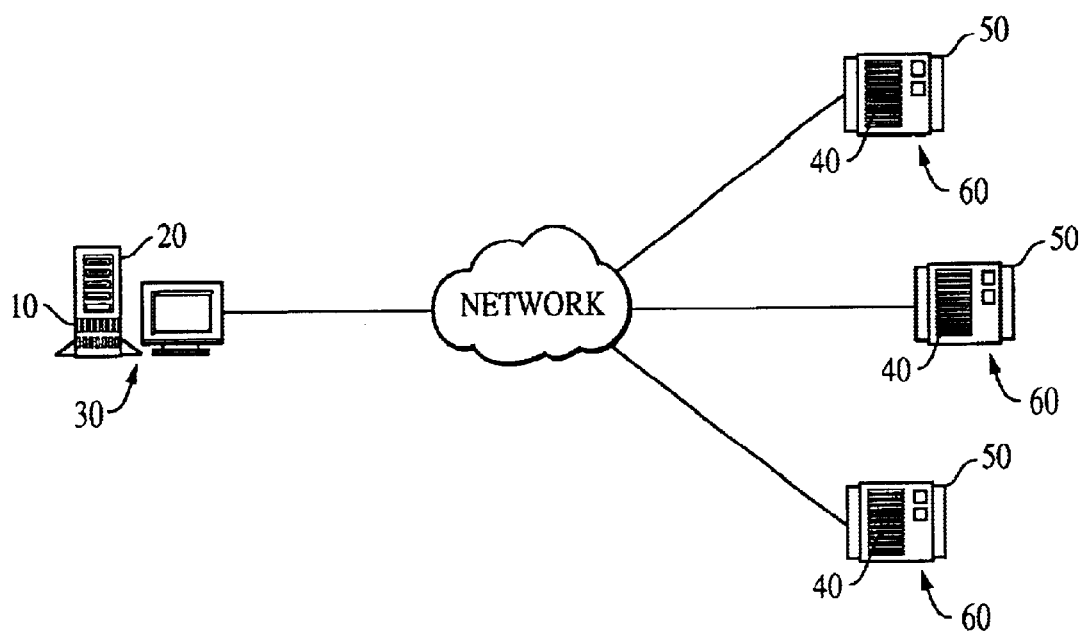
FIG. 1 is a diagram of a file system for distributing content on a data network according to an exemplary embodiment of the present invention.

FIG. 1 diagrammatically illustrates a file system for distributing content on a data network according to an exemplary embodiment of the present invention. The file system comprises a file replication and transfer system 10 on a file storing and serving device 20 at a master site 30 and a plurality of replicated file receiver systems 40 on respective file storing and serving devices 50 at remotely located mirror sites 60. The file storing and serving devices 20, 50 typically comprise conventional file servers or any other suitable device for storing and serving files. The file storing and serving devices 20, 50 at the master and mirror sites 30, 60 are communicatively connected by a network, which may be any private or public network, or any mix thereof, suitable for carrying data. The mirror sites 60 may be geographically distributed, for example, on regional backbones of the Internet. The file storing and serving devices 50 at each mirror site 60 may include a copy of the files stored on the file storing and serving device 20 at the master site 30. The file storing and serving device 50 at the mirror sites 60 may also be communicatively connected with one another so that file changes can be distributed among the file storing and serving devices 50 at the mirror sites 60. One of the primary goals of the file system of the present invention is to look for changes made to existing files on the file storing and serving device 20 at the master site 30 and new files created on the file storing and serving device 20 at the master site 30, replicate these files changes and new files and transfer the replicated file changes and new files to one or more of the file storing and serving devices 50 at the mirror sites 60 as will be described in greater detail below.

Figure 2:
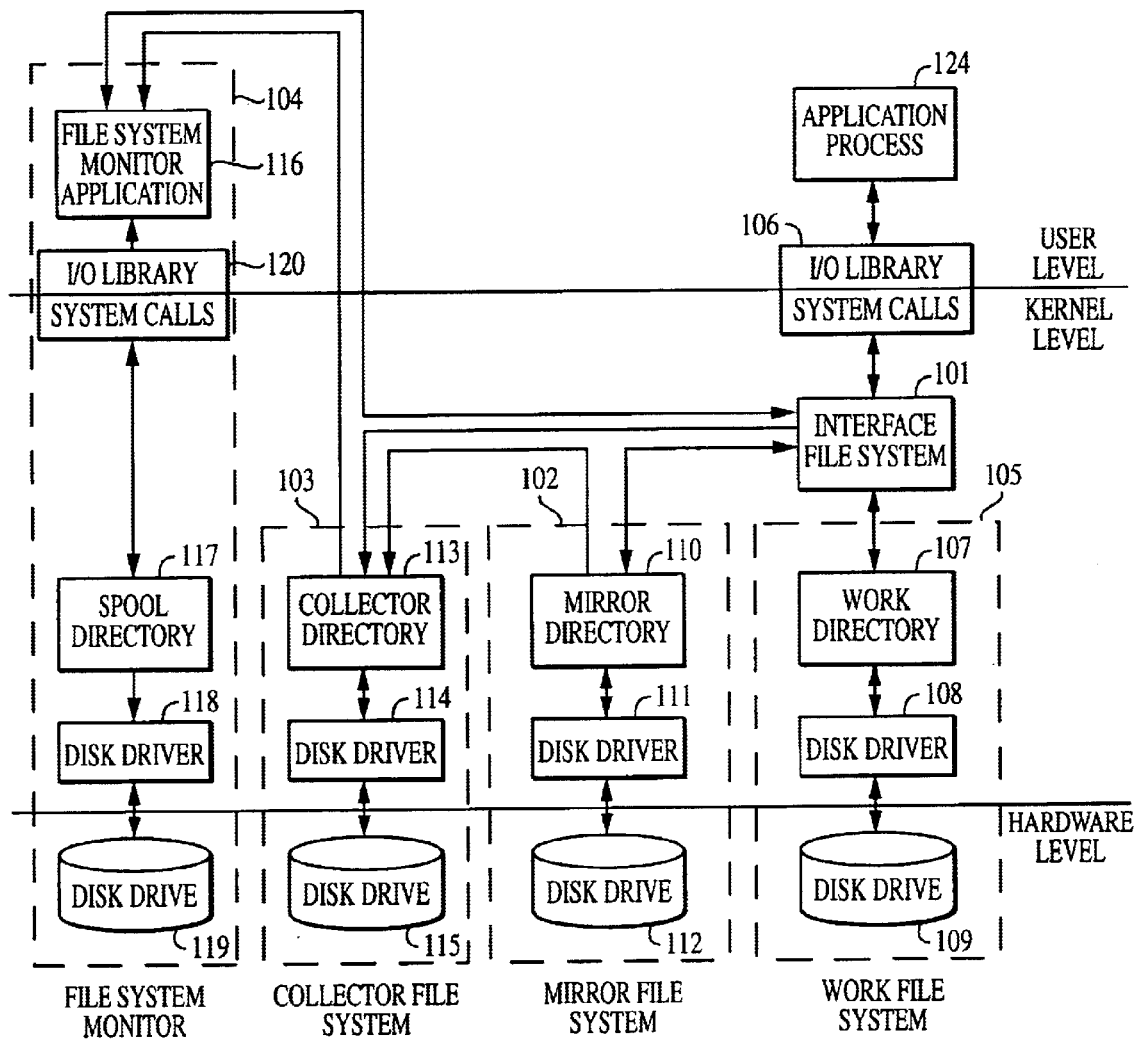
FIG. 2 is a block diagram of the file replication and transfer system according to an exemplary embodiment of the present invention.

FIG. 2 is a block diagram of the file replication and transfer system 10 according to an exemplary embodiment of the present invention. The file replication and transfer system 10 comprises: an interface file system 101; a mirror file system 102; a collector file system 103; and a file system monitor 104. The interface file system 101 is mounted or stacked on top of the file storing and serving device's 20 work file system 105 and responds to calls from, and returns data to, an input/output (I/O) library 106 which converts user mode requests or commands from an application process 124 into kernel mode system calls that invoke certain events from the interface file system 101.

The work file system 105, on top of which the interface file system 101 is mounted, may include a work directory 107, a disk driver 108 and a disk drive 109. The mirror file system 102 may include a mirror directory 110, a disk driver 111 and a disk drive 112. The collector file system 103 may include a collector directory 113 a disk driver 114 and a disk drive 115. The file system monitor 104 may include a file system monitor application 116, a spool directory 117, a disk driver 118, a disk drive 119, and an input/output (I/O) library 120. The operations and interactions which take place between the directories 107, 110, 113, 117 and their associated disk drivers 108, 111, 114, 118 and disk drives 109, 112, 115, 119 are well known in the art and, therefore, need not be discussed further herein. The file system monitor's input/output (I/O) library 120 converts user mode file system monitor application requests or commands into kernel mode system calls that invoke certain events from the spool directory 117.

It should be noted that the disk drives 109, 112, 115, 119 utilized in the work, mirror, and collector file systems 105, 102, 103 and the file system monitor 104 are exemplary and may be replaced by other physical or virtual memory devices in other embodiments of the present invention. For example the disk drives 109, 112, 115, 119 may be partitions or directories of a single disk drive. However, persons of ordinary skill in the art will recognize that separate physical memory devices are preferred as they usually improve efficiency where access to the disk drives 109, 112, 115, 119 is made independently or simultaneously, or if the mirror and collector disk drives 112, 115 actually share the same physical disk device.

Figure 3:
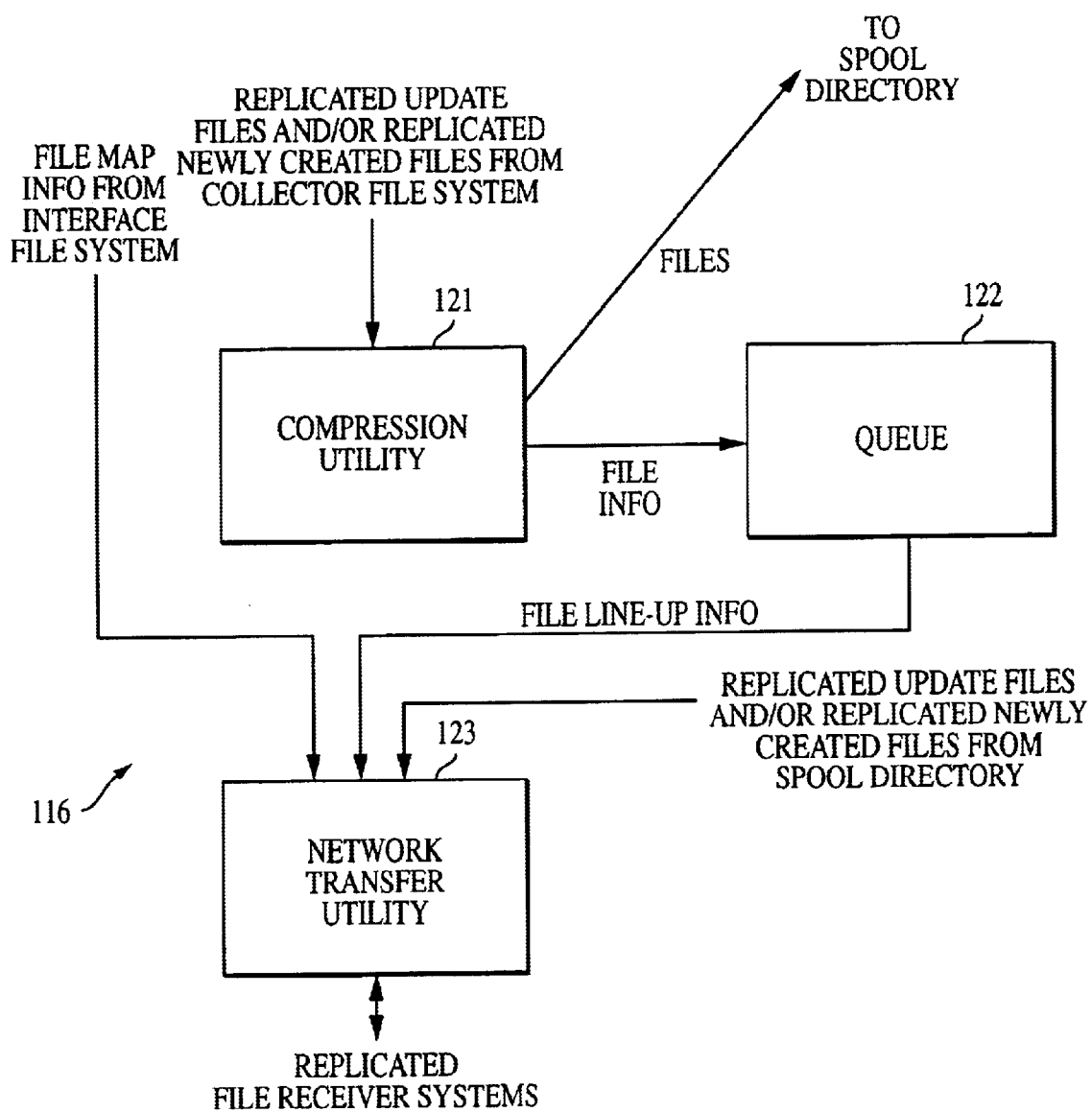
FIG. 3 is a block diagram of the file system monitor application according to an exemplary embodiment of the present invention.

FIG. 3 is a block diagram of the file system monitor application 116 according to an exemplary embodiment of the present invention. The file system monitor application, which is a key component of the file system monitor 104, 116 may include a compression utility 121, an output queue 122 and a network transfer utility 123. The file system monitor application 116 and the interface file system 101 communicate with each other through any suitable protocol. This permits the file system monitor application 116, which runs in the user mode, to monitor asynchronous events occurring with the interface file system 101 in the kernel mode. With the knowledge of events occurring with the interface system 101, the file system monitor 104 causes the collector, mirror, and work file systems in the kernel mode to transfer replicated file updates and/or replicated newly created files (generated in the work file system) to the file system monitor's the spool directory 117, where they will then be transferred at the appropriate time to the replicated file receiver systems on the servers at the mirror sites.

Referring collectively now to FIGS. 2 and 3, the general operation of the file replication and transfer system 10 of the present will now be described. In the user mode, the application process 124 generates a request or command for a file. The application process 124 may be any computer application that might operate on a file. The application process 124 may dictate a specific user mode request for a file, by which a user or process may read data from, or write data to a file. The I/O library 106 on the user level converts the file request into a system call suitable for a kernel mode. System calls may include, for example, open calls, close calls, read calls, write calls, create file calls, delete file calls, rename file calls, change attribute file calls, truncate file calls, and the like. The file storing and serving device's 20 operating system kernel (not illustrated), in response to the system call generated in the kernel mode by the I/O library 106, sends the call to the interface file system 101. The interface file system 101 passes the system call to the work file system 105 for conventional processing without any interruption. The interface file system 101 will also replicate the system call, if it relates to a file change or deletion, and send the replicated call to the mirror file system 102. In response to the system call, the mirror file system 102 will create and store a record representative of the file change (update file). The update file replicates the changes made to the corresponding file stored in the work file system.

At an appropriate time as requested by the file system monitor 104, update files may be copied from the mirror file system 102 to the collector file system 103. When appropriate, the file system monitor 104 will then request the update file to be copied from the collector file system 103 to its spool directory 117. In the case of a new file written to the work file system 105, when appropriate, the file system monitor 104 will request the new file to be copied directly from the work file system 105 to its spool directory 117. As the update file or replicated new file is copied to the spool directory, the compression utility 121 of the file system monitor application 116 may be employed to compress the file if necessary. For example, if the file is already well compressed, such as in the case of a MPEG or JPEG encoded file, compression via the compression utility 121 would not ordinarily be required. The file system monitor application 116 may also perform additional functions, such as encryption of the update files and new files, and may include any other control, authentication, or error correction information along with the update file data for transmission therewith, or in a header appended thereto. For example, authentication may be performed using MD4, MD5, double MD5 (e.g., E=MD5(key1,MD5(key2, pass)), or any other one-way hash function or other suitable authentication scheme.

Figure 4A:
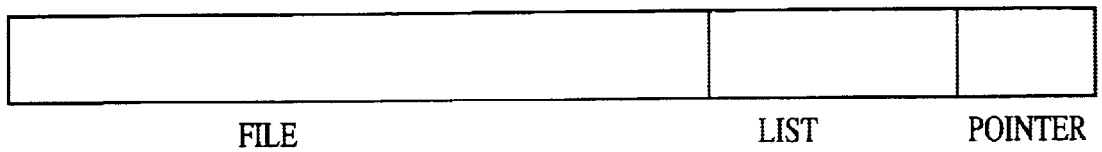
FIG. 4A is a diagram of an update file having a file map appended as a list to an end thereof.

A further function of the file system monitor 104 includes using the information obtained from the knowledge of the events occurring with the interface file system 101, which may contain details concerning control information, file size, and offsets, to create a file map of the update file. The file map and possible other subsequent file maps corresponding to changes made to the update file are generated by the network transfer utility 123 and appended as a list to the end of the update file as shown in FIG. 4A, when the network transfer utility 123 transfers the file from the spool directory 117 to the replicated file receiver systems 40 on the servers 50 at the mirror sites 60. A pointer, which comprises some type of data, is used to identify where the list begins, i.e., identifies the list offset. The file map enables the replicated file receiver systems 40 on the servers 50 at the mirror sites 60 to construct a new version of the corresponding existing file stored thereon using the data from the update file and the data from the existing file. A truncate file call may be presented in the map as a separate field.

Figure 4B:
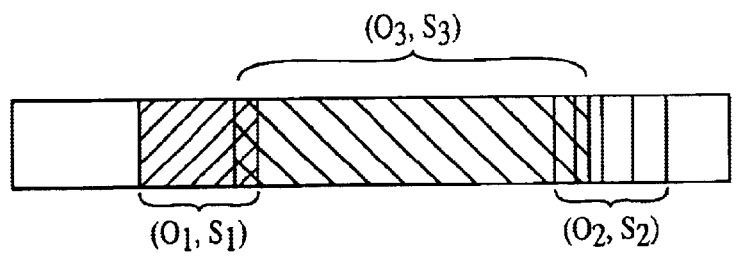
FIG. 4B is an enlarged diagram of three file maps.
Figure 4C:
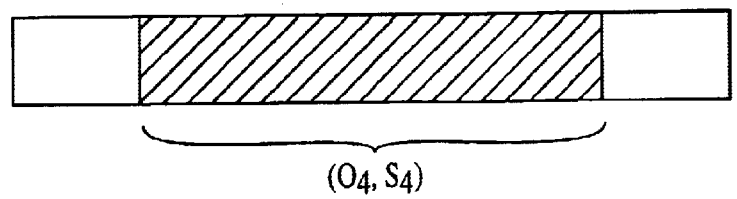
FIG. 4C is an enlarged diagram of a file map created by combining the file maps illustrated in FIG. 4B.

The file map also enables the file system monitor 104 to optimize the update file prior to its transfer to the mirror sites. For example, if the file system generates three maps for a particular update file (indicative of two subsequent changes made to the update file), as illustrated in FIG. 4B, data in two or more of these maps may be combined into a single map as illustrated in FIG. 4C, if the data in the maps overlap. Thus, only the single map need be appended to the update file when it is transferred.

Referring again to FIGS. 2 and 3, as the replicated update file (or replicated new file) is copied to the spool directory 117 of the file system monitor 104, file information is transmitted to the queue 122 in the file system monitor application 116. The network transfer utility 123 of the file system monitor application uses queuing information obtained from the queue 122 to transfer the update files and/or replicated new files stored in the spool directory over the network to the replicated file receiver systems 40 running on the servers 50 at the mirror sites 60.

The file replication and transfer system 10 of the present invention uses the transparency of the kernel mode to the user mode in a manner that permits it to transparently track changes made to files stored in the server 20 at the master site 30 or track new files created on the server 20 at the master site 30. By tracking changes in the kernel mode, user mode application processes may make changes to files stored in the server hardware level, and these changes may be tracked without any explicit action in the user mode. Tracking changes in the kernel mode in accordance with the present invention, also permits incremental changes to be sent to the replicated file receiver systems 40 operating on the servers 50 at the mirror sites 60 without transmitting and replacing potentially large files.

Figure 5:
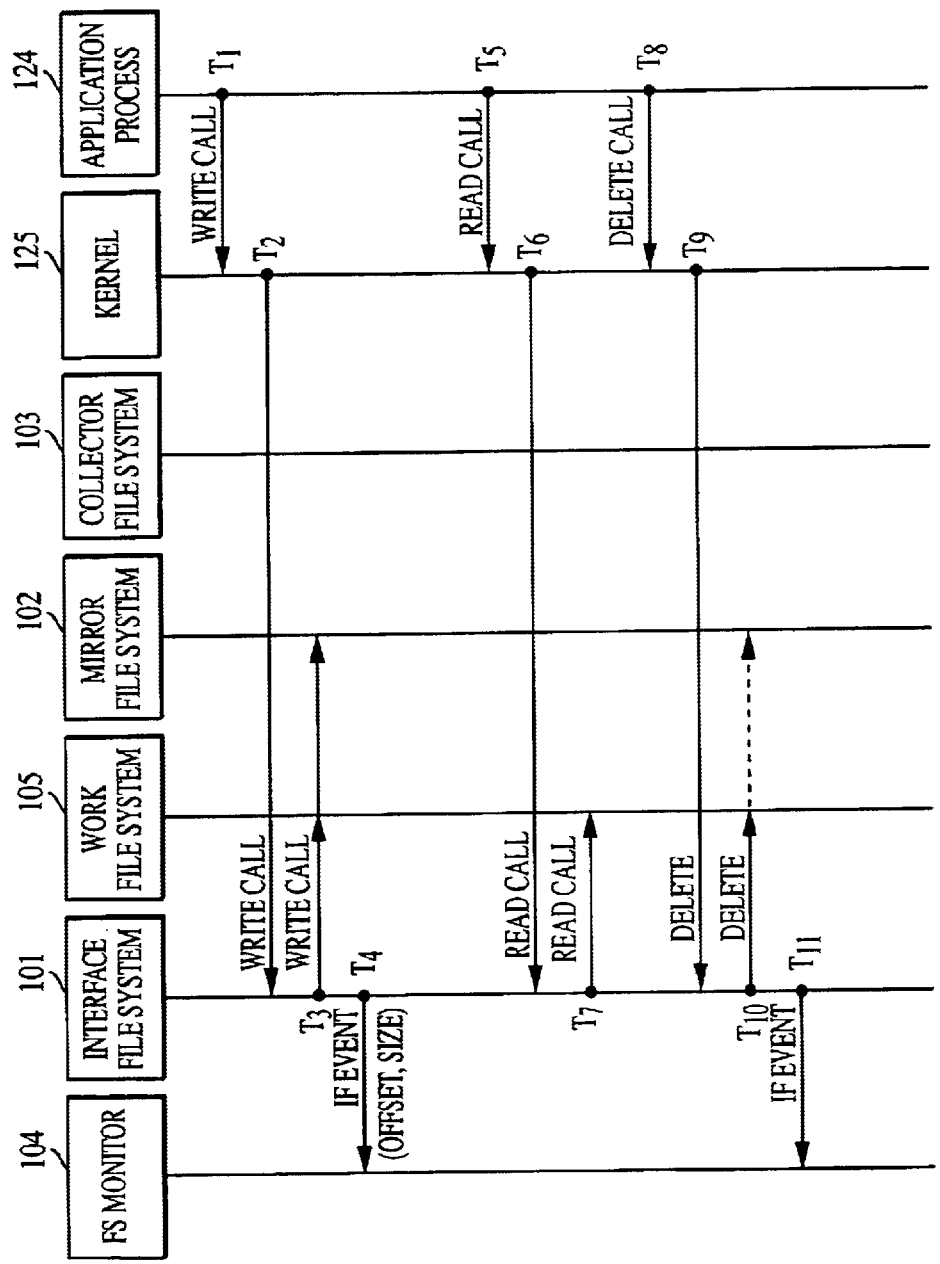
FIG. 5 is a timing diagram that illustrates how the file replication and transfer system processes write, read and delete requests generated from one or more application processes.

FIG. 5 illustrates how the file replication and transfer system 10 of the present invention may process write, read and delete requests generated from one or more application processes. At time $T_1$, the application process 124 submits a write request to write to a file stored in the work file system 105, and the I/O library 106 (FIG. 2) outputs an appropriate call such as write (fd, offset, *data, data_size) to the kernel 125. The write call may include a file descriptor fd (generated in a previously processed open call open(fname)) that provides a method for identifying which file stored in the work file system 105 is to be changed. The write call will also include information about what is going to be written to the file, i.e., offset, *data, and data_size. At time $T_2$, the kernel 125 sends the write call to the interface file system 101. At time $T_3$, the interface file system 101 passes the write call to the work file system 105, which responds to the call by writing the data_size bytes of data pointed to by the pointer, *data, to the file stored therein identified by fd, at a location within that file defined by the offset.

At time $T_3$, the interface file system 101 also replicates the write call write (fd, offset, *data, data_size) and sends it to the mirror file system 102. In response thereto, the mirror file system 102 creates and stores an update file that replicates only the new data just written to the file fd in the work file system 105. The update file has a size equal to the file fd stored in the work file system 105, i.e., data_size plus the offset, but includes only the new data submitted in the write call. Since the update file includes only data changes resulting from the write call, it is highly compressible. Any subsequent changes written to the file fd in the work file system 105 will be recorded in the update file in the mirror file system 102, while subsequent changes to different files in the work file system 105 will respectively result in the creation of additional update files in the mirror file system 102.

At time $T_4$, the interface file system 101 sends an event to the file system monitor 104 which indicates that the mirror file system 102 has created and stored an update file which represents the new data written to file fd in the work file system 105. This event includes parameters for generating a file map. As discussed earlier, this and any other maps corresponding to changes made in the update file will be appended as a list to the end of the update file.

The interface file system 101 is transparent for read system calls. For example, at time $T_5$, the application process 124 may submit a read request to read the file fd stored in the work file system 105. In response thereto, the I/O library 106 outputs an appropriate call such as read(fd) to the kernel 125. At time $T_6$, the kernel sends the read call to the interface file system 101. At time $T_7$, the interface file system 101 simply passes the read call to the work file system 105 where it is conventionally processed. Because read system calls require no changes to the file fd, no action is taken by the interface file system 101, therefore no event is sent to the file system monitor 104.

At time $T_8$, the application process may then submit a delete request to delete the file fd stored in the work file system 105. The I/O library 106, therefore, outputs an appropriate call such as delete (fd) to the kernel. At time $T_9$, the kernel sends the delete call to the interface file system 101. At time $T_{10}$, the interface file system 101 passes the delete call to the work file system 105, which results in deletion of the file fd. The interface file system 101 also replicates the delete call and sends it to the mirror file system 102, which results in deletion of the corresponding update file from the mirror file system 102. (The interface file system 101 takes no action if no corresponding update file exists in the mirror file system 102.) At time $T_{11}$, the interface file system 101 sends an event to the file system monitor 104 which indicates that the mirror file system 102 has deleted the update file. When this happens, file map information corresponding to that file is deleted from the file system monitor 104. Note that the system actions from time $T_8$ to time $T_{11}$ also take place when a file is renamed, truncated or its attributes are changed.

Figure 6:
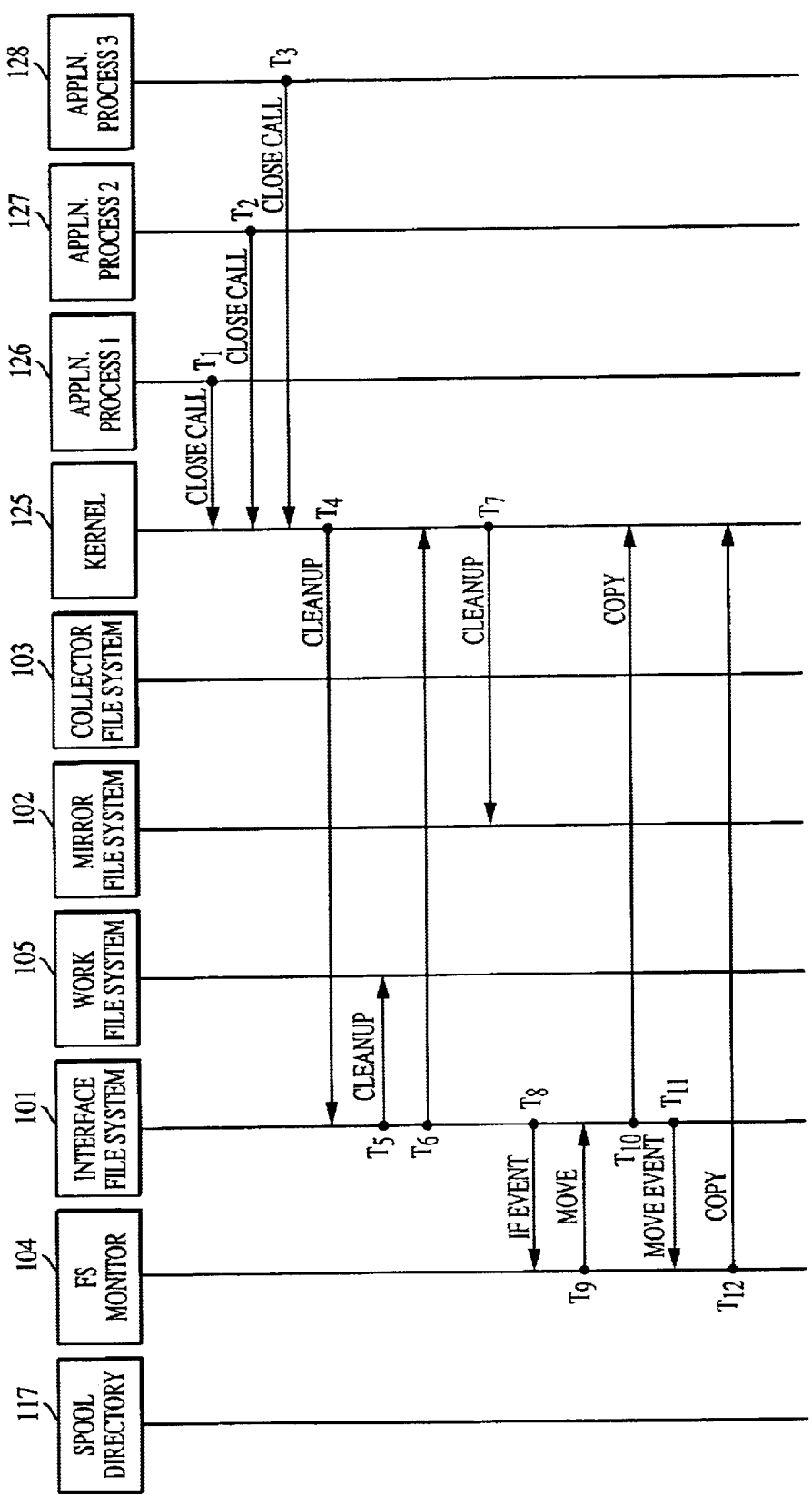
FIG. 6 is a timing diagram that illustrates how the file update replication and transfer system of the present invention processes close requests generated from one or more application processes and prepares the update file for transfer.

FIG. 6 illustrates how the file update replication and transfer system of the present invention may process close requests generated from one or more application processes and may prepare the update file for transfer. For the sake of clarity, only critical interactions are described as one of ordinary skill in the art will recognize that other less critical interactions may be taking place, such interactions being well known in the art. At some moment in time, it will become desirable to transfer an update file stored in the mirror file system to the replicated file receiver systems 40 of the servers 50 at the mirror sites 60 (FIG. 1). If the update file is transferred at this time, it may still be open and receiving writing changes from one or more application processes and, therefore, may be inconsistent. Thus, in order to ensure the consistency of the data in the update file, i.e., the update file reflects all the changes of some version of the a file fd, when possible (just as the version of the file fd comes into existence), the kernel 125 sends a clean-up event or any other equivalent notice to the update file system 101. This will typically happen when close calls close(fd) are received by the kernel via the I/O library 106 (FIG. 2) from each open application process 126, 127, 128 such as at times $T_1$, $T_2$, and $T_3$. When the last application process 128 has closed the file in the work file system 105, such as at time $T_4$ the kernel 125 will then send the aforementioned cleanup event to the interface file system 101. The cleanup event enables the interface file system 101 to know that the file in the work file system 105 is finally closed. At time $T_5$, the interface file system 101 passes the cleanup event to the work file system 105 for processing. At time $T_6$, the interface file system sends a request to the kernel 125 to close the update file in the mirror file system 102. At time $T_7$, the kernel sends a cleanup event to the mirror file system 102, which closes the update file, resulting in a version thereof (with consistent data) in the mirror file system 102. At time $T_8$, the interface file system 101 sends an event to the file system monitor 104, which indicates that some version of the update file is now stored in the mirror file system 102.

At some time $T_9$, the transfer process commences under the control of the file system monitor 104, which sends a special request to the interface file system 101. In response thereto, the interface file system 101 may copy the update file in the mirror file system 102 to the collector file system 103, or it may postpone the copy if the file in working file system 105 and the update file in the mirror file system 102 are open again by some application. At some time $T_{10}$ the interface file system 101 copies the update file in the mirror file system 102 to the collector file system 103. At some time $T_{11}$ the interface file system sends an event to the file system monitor 104, which indicates that some version of the update file is now stored in the collector file system 103. The copy command may alternatively result in only a renaming of the update file when the file systems reside on the same partitions of a disk drive and no physical relocation is required to reflect the file's reassignment to the new file system.

Then at some other moment in time $T_{12}$, the file system monitor 104 may send a second copy command to the kernel 125. This copy command causes the update file to be copied from the collector file system 103 to the spool directory 117 of the file system monitor 104. As the update file is copied to the spool directory 117, it may be compressed by the compression utility 121 of the file system monitor application 116 if deemed necessary. Once in the spool directory 117, the update file can be transferred to the replicated file receiver systems 40 on the servers 50 at the mirror sites 60.

Figure 7:
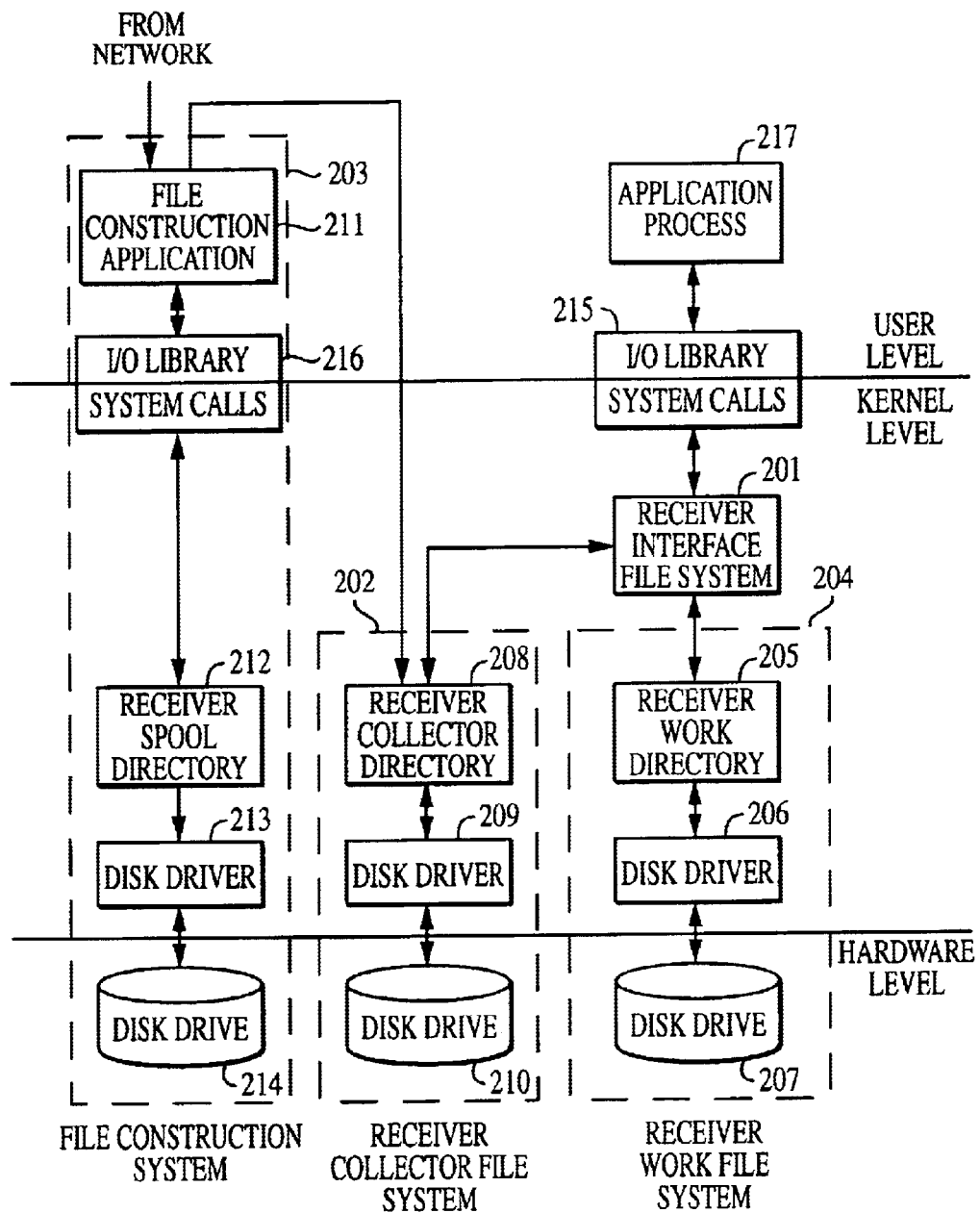
FIG. 7 is a block diagram of the replicated file receiver system according to an exemplary embodiment of the present invention.

FIG. 7 is a block diagram of the replicated file receiver system 40, on each of the servers at the mirror sites, according to an exemplary embodiment of the present invention. The replicated file receiver system 40 typically comprises: a receiver interface file system 201; a receiver collector file system 202; and a file construction system 203. The receiver interface file system 201 is mounted or stacked on top of the mirror server's 50 receiver work file system 204 and responds to calls from, and returns data to, an input/output (I/O) library 215 which converts user mode requests or commands from an application process 217 into kernel mode system calls that invoke certain events from the receiver interface file system 201.

The receiver work file system 204 may include a receiver work directory 205, a disk driver 206 and a disk drive 207.

The receiver collector file system 202 may include a receiver collector directory 208 a disk driver 209 and a disk drive 210. The file construction system 203 may include a file construction application 211, a receiver spool directory 212, a disk driver 213, a disk drive 214, and an input/output (I/O) library 216. The operations and interactions which take place between the directories 205, 208, 212 and their associated disk drivers 206, 209, 213 and disk drives 207, 210, 214 are well known in the art and, therefore, need not be discussed further herein. The input/output (I/O) library 216 of the file construction system 203 converts user mode file construction system application requests or commands into kernel mode system calls that invoke certain events from the receiver spool directory 212.

It should be noted that the disk drives 207, 210, 214 utilized in the receiver work and collector file systems 204, 202 and the file construction system 203 are exemplary and may be replaced by other physical or virtual memory devices in other embodiments of the present invention. For example the disk drives 207, 210, 214 may be partitions of a single disk drive. However, persons of ordinary skill in the art will recognize that separate physical memory devices are preferred as they usually improve efficiency where access to the disk drives 207, 210, 214 is made independently or simultaneously.

The file construction system 203 receives data pertaining to update files or new files from the network (transferred from the file replication and transfer system 10 on the master site server 20). The file construction application 211 decodes this data to create a copy of the update file in the receiver spool directory 212. The file construction application 211 can be adapted to decode data encoded in any conventional manner.

In the case of new files, the file construction application 211 copies the new file stored in the receiver spool directory 212 directly to the receiver work file system 204 and sends a notification of this to the receiver interface file system 201. In the case of update files, the file construction application 211 reads the update file stored in the receiver spool directory 212 and reads the corresponding existing or "old" version of the file stored in the receiver work file system 204 and constructs a new version of the file in the receiver collector file system 202. The file construction application 211 then deletes the update file from the receiver spool directory 212 and sends a notification of this to the receiver interface file system 201.

Figure 8A:
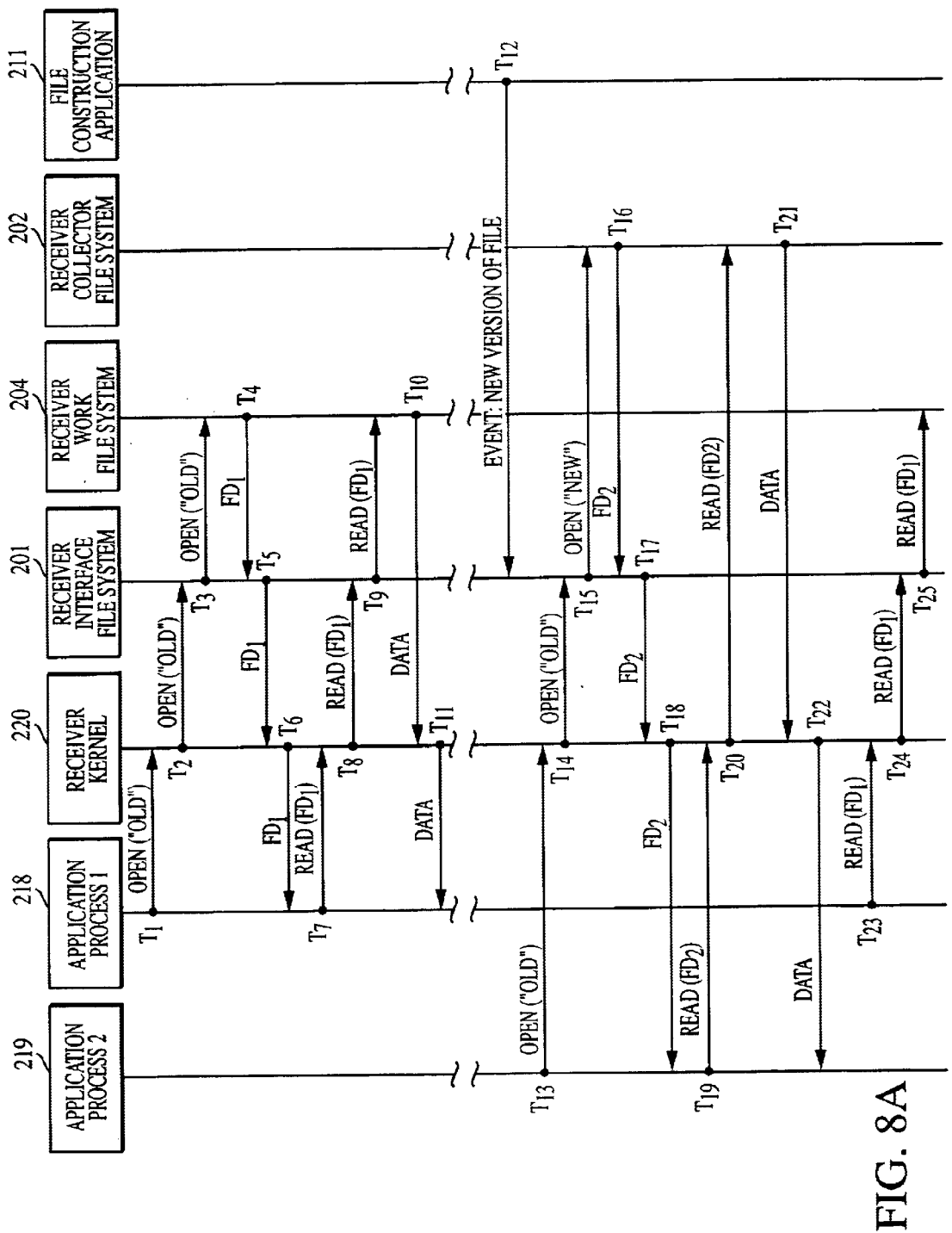
FIGS. 8A and 8B illustrate how the replicated file receiver system on each of the servers at the mirror sites works with both the new and old versions of a file.
Figure 8B:
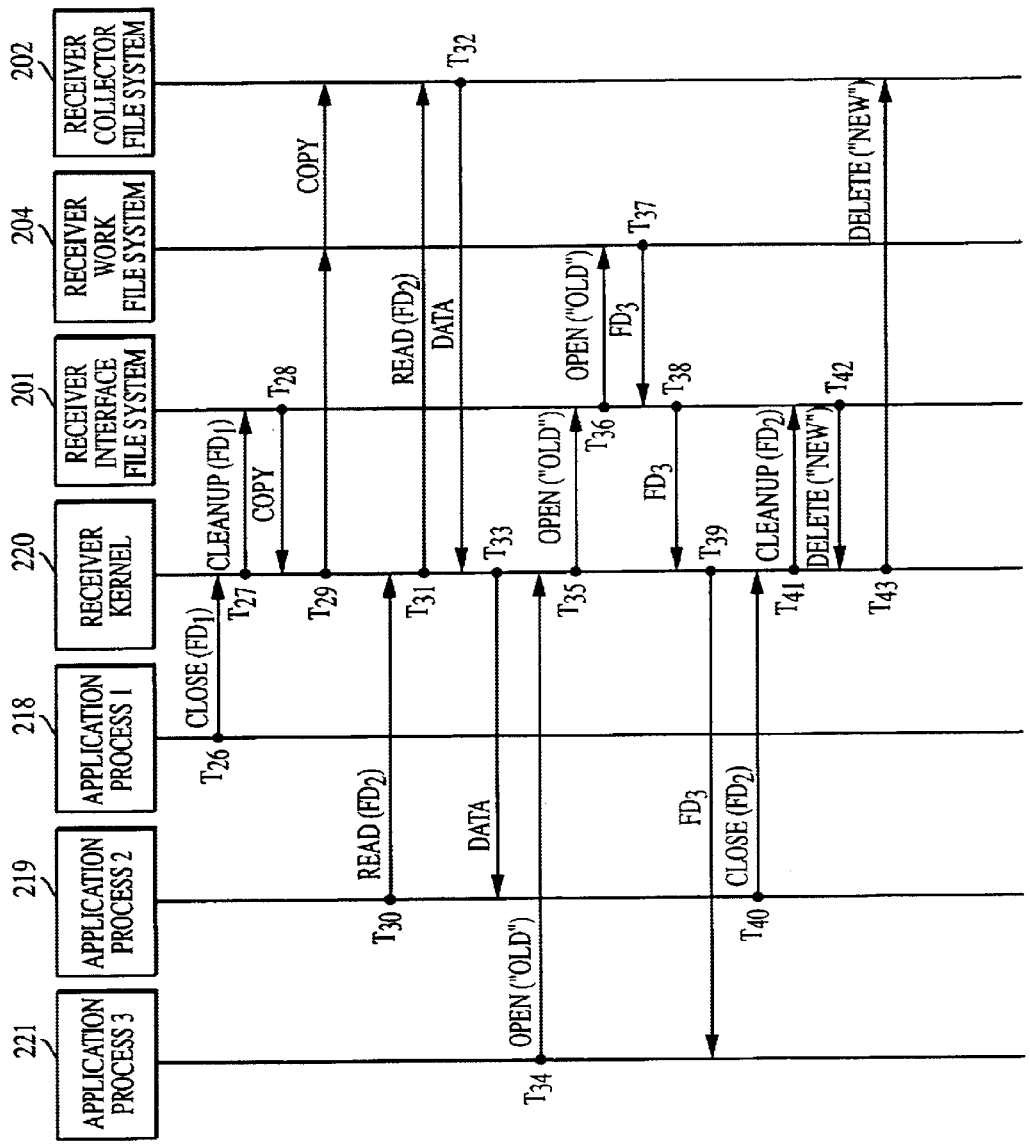

FIGS. 8A and 8B illustrate how the replicated file receiver system 40 on each of the servers 50 at the mirror sites 60 works with both the new and old versions of a file. Referring first to FIG. 8A, assume for example, in an initial state, the receiver work file system 204 is storing one or more "old" files and that the receiver collector file system 202 is empty. At time $T_1$, a first application process 218 submits an open request to open an old file (fname), and the receiver I/O library 215 outputs an appropriate system call such as open (old fname) to the receiver kernel 220. At time $T_2$, the receiver kernel 220 (mirror site file storing and serving device 40 operating system kernel) sends the open call to the receiver interface file system 201. At time $T_3$, the receiver interface file system 201 passes the open call to the receiver work file system 204 which responds to the call at time $T_4$ by returning a file descriptor (fd1) to the receiver interface file system 201. At time $T_5$, the receiver interface file system 201 returns the file descriptor (fd1) to the receiver kernel 220 and at time $T_6$, the receiver kernel 220 returns the file descriptor (fd1) to the first application process 218. At time $T_7$, the first application process 218 submits a read request to read the file (fd1), and the receiver I/O library 215 outputs an appropriate system call such as read (fd1) to the receiver kernel 220. At time $T_8$, the receiver kernel 220 sends the read call to the receiver interface file system 201. At time $T_9$, the receiver interface file system 201 passes the read call to the receiver work file system 204 which responds to the call at time $T_{10}$ by sending "old" data (fd1) to the receiver kernel 220 (the "old" data passes through the receiver interface file system 201) and at time $T_{11}$, the receiver kernel 220 sends the "old" data (fd1) to the first application process 218.

At time $T_{12}$, an event is sent by the file construction application 211 indicating that a new version of the file name) has been created and stored in the receiver collector file system 202. At time $T_{13}$, a second application process 219 submits an open request to open the old file (fname), and the receiver I/O library 215 outputs open call open (old fname) to the receiver kernel 220. At time $T_{14}$, the receiver kernel 220 sends the open call to the receiver interface file system 201. Because the receiver interface file system 201 is aware of the new version of the file fname) stored in the receiver collector file system 202, at time $T_{15}$, the receiver interface file system 201 generates and sends an open call open (new fname) to the receiver collector file system 202 and does not pass the open call open (old fname) to the receiver work file system 204. At time $T_{16}$, the receiver collector file system 202 by returns a file descriptor (fd2) to the receiver interface file system 201. At time $T_{17}$, the receiver interface file system 201 returns the file descriptor (fd2) to the receiver kernel 220 and at time $T_{18}$, the receiver kernel 220 returns the file descriptor (fd2) to the second application process 219. At time $T_{19}$, the second application process 219 submits a read request to read the file (fd2), and the receiver I/O library 215 outputs a read call read (fd2) to the receiver kernel 220. At time $T_{20}$, the receiver kernel 220 sends the read call directly to the receiver collector file system 202, which responds to the call at time $T_{21}$ by sending "new" data (fd2) to the receiver kernel 220 and at time $T_{22}$, the receiver kernel 220 sends the new data (fd2) to the second application process 219.

As should now be apparent, when the receiver interface file system 201 becomes aware of a new file version in the receiver collector file system 202, it modifies all open system calls from subsequent application processes and opens the new version of the file stored in the receiver collector file system 202. Accordingly, all application processes generating open system calls prior to the creation of the new file version work with the receiver work file system 204 and read the old version of the file and all application processes generating open system calls after the creation of the new file version work with the receiver collector file system 202 and read the new version of the file. Consequently, if at time $T_{23}$ the first application process 218 submits another read request to read the file (fd1), at time $T_{24}$ the receiver kernel 220 will send the read call to the receiver interface file system 201 which in turn will pass the read call at time $T_{25}$ to the receiver work file system 204. Thus, old data (fd1) will be returned to the first application process 218.

Referring now to FIG. 8B, at time $T_{26}$, the first application process 218 submits a close request to close the old file (fd1), and the receiver I/O library 215 outputs a close call close (fd1) to the receiver kernel 220. If the first application process 218 is the last application process to closed the file, at time $T_{26}$ the receiver kernel 220 will send a cleanup event for old file (fd1) to the receiver interface file system 201. At time $T_{28}$, the receiver interface file system 201 sends a command to the receiver kernel 220 to copy the new version of the file, which results copying of the new version of the file to the receiver work file system 204 at time $T_{29}$. Thus, the new version of the file takes on the status of the "old" or existing version of the file in the receiver work file system 204. The copying process is similar to the copying process described earlier in the discussion of the file replication and transfer system 10.

At time $T_{30}$, the second application process 219 submits a read request to read the file (fd2), and the receiver I/O library 215 outputs a read call read (fd2) to the receiver kernel 220. At time $T_{31}$, the receiver kernel 220 sends the read call directly to the receiver collector file system 202, which responds to the call at time $T_{32}$ by sending new data (fd2) to the receiver kernel 220 and at time $T_{33}$, the receiver kernel 220 sends the new data (fd2) to the second application process 219.

At time $T_{34}$, a third application process 221 submits an open request to open the old file (fname), and the receiver I/O library 215 outputs open call open (old fname) to the receiver kernel 220. At time $T_{35}$, the receiver kernel 220 sends the open call to the receiver interface file system 201. At time $T_{36}$, the receiver interface file system 201 sends the open call to the receiver work file system 204. At time $T_{37}$ the receiver work file system 204 returns a file descriptor (fd3) to the receiver interface file system 201. At time $T_{38}$, the receiver interface file system 201 returns the file descriptor (fd3) to the receiver kernel 220 and at time $T_{39}$, the receiver kernel 220 returns the file descriptor (fd3) to the third application process 221.

At time $T_{40}$, the second application process 219 submits a close request to close the new file (fd2), and the receiver I/O library 215 outputs a close call close (fd2) to the receiver kernel 220. If the second application process 219 is the last application process to closed the new file (fd2), at time $T_{41}$ the receiver kernel 220 will send a cleanup event for the new file (fd2) to the receiver interface file system 201. At time $T_{42}$, the receiver interface file system 201 sends a command to the receiver kernel 220 to delete the new version of the file, which results in the deletion of the new version of the file from the receiver collector file system 202 at time $T_{43}$.

While the foregoing invention has been described with reference to the above embodiments, various modifications and changes can be made without departing from the spirit of the invention. Accordingly, all such modifications and changes are considered to be within the scope of the appended claims.

What is claimed is:

1. A method for distributing content in a data network, the method comprising the steps of:
   receiving a request for a file stored in a work file system;
   in response to the request, generating a system call to process the file request;
   creating an update file;
   monitoring the contents of the file stored in the work file system to track changes made to the contents;
   recording changes made to the contents of the file in the update file;
   generating a notification for each one of the changes made to the contents of the file stored in the work file system, the notification indicating that the update file reflects all the changes of a version of the file; and
   at a predetermined time, distributing the update file over the data network to a receiver work file system.

2. The method according to claim 1, wherein the receiver work file system stores a copy of the file without the changes.

3. The method according to claim 1, wherein the update file is created in a mirror file system.

4. The method according to claim 3, wherein prior to the distributing step and in response to the generating step, further comprising the step of copying the update file from the mirror file system to a collector file system.

5. The method according to claim 1, wherein prior to the distributing step, further comprising the step of copying the update file to a spool directory.

6. The method according to claim 1, wherein prior to the distributing step, further comprising the step of compressing the update file.

7. The method according to claim 1, wherein prior to the distributing step, further comprising the step of generating a map of the update file and appending the map to the update file.

8. The method according to claim 2, further comprising the step of incorporating the changes provided by the update file into the copy of the file stored in the receiver work file system.

9. The method according to claim 8, wherein the incorporating step includes the step of constructing a new version of the file from the copy of the file and the update file.

10. The method according to claim 9, further comprising the step of working with the copy of the file if an open request for the copy of the file stored in the receiver work file system has been made prior to the construction of the new version of the file.

11. The method according to claim 9, further comprising the step of working with the new version of the file if an open request for the copy of the file stored in the receiver work file system has been made after the construction of the new version of the file.

12. The method according to claim 9, further comprising the steps of working with the copy of the file if an open request for the copy of the file stored in the receiver work file system has been made prior to the construction of the new version of the file; and
   working with the new version of the file if an open request for the copy of the file stored in the receiver work file system has been made after the construction of the new version of the file.

13. The method according to claim 9, wherein the incorporating step further includes storing the new version of the file in a receiver collector file system.

14. The method according to claim 1, wherein the monitoring and creating steps are performed in a kernel mode.

15. The method according to claim 1, wherein the notification generating step is performed by a interface file system.

16. The method according to claim 15, wherein the interface file system is mounted on the work file system.

17. The method according to claim 9, further comprising the step of generating a notification that the new version of the file has been constructed.

18. The method according to claim 17, wherein the steps of constructing a new version of the file and generating a notification that the new version of the file has been constructed is performed by a file construction system.

19. The method according to claim 18, further comprising the step of providing a receiver interface file system, which prior to the step of generating a notification that the new version of the file has been constructed, enables work to be conducted with the copy of the file if an open request for the copy of the file has been made prior to the construction of the new version of the file.

20. The method according to claim 19, wherein the receiver interface file system is mounted on the receiver work file system.

21. The method according to claim 18, further comprising the step of providing a receiver interface file system, which in response to the step of generating a notification that the new version of the file has been constructed, enables work to be conducted with the new version of the file if an open request for the copy of the file has been made after the notification that the new version of the file has been constructed.

22. The method according to claim 21, wherein the receiver interface file system is mounted on the receiver work file system.

23. The method according to claim 18, further comprising the step of providing a receiver interface file system, which prior to the step of generating a notification that the new version of the file has been constructed, enables work to be conducted with the copy of the file if an open request for the copy of the file has been made prior to the construction of the new version of the file, and which in response to the step of generating a notification that the new version of the file has been constructed, enables work to be conducted with the new version of the file if an open request for the copy of the file has been made after the notification that the new version of the file has been constructed.

24. The method according to claim 23, wherein the receiver interface file system is mounted on the receiver work file system.

25. A method for distributing content in a data network, the method comprising the steps of:
   monitoring a work file system to determine if a file is created and stored in a work file system;
   receiving a request to create a file in the work file system;
   in response to the request, generating a system call to create the file;
   creating and storing the file in the work file system;
   generating a notification that the file has been created and stored in the work file system;
   at a predetermined time, distributing a copy of the file over the data network to a receiver work file system;
   monitoring the contents of the file to track changes made to the contents; and
   at another predetermined time, distributing a cony of the file over the data network to the receiver work file system if a change to the contents of the file has been observed.

26. A file system for distributing content in a data network, the system comprising:
   an interface file system for looking for changes made to contents of files already stored in the work file system;
   a mirror file system communicatively associated with the interface file system, the mirror file system creates an update file when a request for a file stored in the work file system is made to record changes to the contents of a file stored in the work file system observed by the interface file system;
   a file system monitor communicatively associated with the interface file system, that monitors events occurring with the interface file system and causes copies of the update file to be transferred over the data network at a predetermined time so that incremental changes to files can be transferred over the data network.

27. The file system according to claim 26, further comprising a collector file system communicatively associated with the mirror file system for temporarily storing a copy of the update file.

28. The file system according to claim 27, wherein the file system monitor causes the update file to be copied from the mirror file system to the collector file system prior to its transfer over the data network to the replicated file receiver system.

29. The file system according to claim 26, wherein the file system monitor includes a spool directory for temporarily storing copies of new files created in the work file system and update files created in the mirror file system that are waiting to be transferred.

30. The file system according to claim 26, wherein the file system monitor includes a spool directory for temporarily storing copies of new files created in the work file system that are waiting to be transferred.

31. The file system according to claim 26, wherein the replicated file receiver system includes a file construction system for constructing a new version of the file from a copy of the file and the update file.

32. The file system according to claim 31, wherein the replicated file receiver system further includes a receiver collector file system for storing the new version of the file.

33. The file system according to claim 31, wherein the replicated file receiver system further includes a receiver interface file system for enabling work to be conducted with the copy of the file if an open request for the copy of the file has been made prior to the construction of the new version of the file, and for enabling work to be conducted with the new version of the file if an open request for the copy of the file has been made after the notification that the new version of the file has been constructed.

34. The file system according to claim 33, wherein the receiver interface file system is mounted on the receiver work file system.

35. A file replication and transfer system for distributing content in a data network, the system comprising:
   an interface file system for looking for new files created and stored in an associated work file system that generates a notification that a file has been created and stored in the work file system; and
   a file system monitor communicatively associated with the interface filing system, for monitoring events occurring with the interface file system, and causing copies of the new files to be transferred over the data network at predetermined times after receiving a notification that the file has been created, monitoring the contents of the new files to track changes made to the contents of the new files, and, at another predetermined time, distributing a cony of one or more of the new files over the data network if changes to the contents of the one or more of the new files have been observed.

36. The file replication and transfer system according to claim 35, Wherein the file system monitor includes a spool directory for storing copies of new files created in the work file system that are waiting to be transferred.

37. A replicated file receiver system for distributing content in a data network, the system comprising:
   a file construction system for receiving copies of new files, and update files transmitted thereto over the data network, each update file carrying information relating to changes to the contents of a file stored on an associated receiver work file system, the file construction system constructing a new version of the file stored on the associated work file system from the file stored on the associated work file system and the update file;
   a receiver collector file system for storing the new version of the file; and
   a receiver interface file system for enabling work to be conducted with the copy of the file if an open request for the copy of the file has been made prior to the construction of the new version of the file, and for enabling work to be conducted with the new version of the file if an open request for the copy of the file has been made after notification that the new version of the file has been constructed.

38. The replicated file receiver system according to claim 37, wherein the receiver interface file system is mounted on the receiver work file system.

39. A computer readable medium comprising a computer program for distributing content in a data network, by performing the steps of:

receiving a request for a file stored in a work file system;

in response to the request, generating a system call to process the file request;

creating an update file;

monitoring the contents of the file stored in the work file system to track changes made to the contents;

recording changes made to the contents of the file in the update file; generating a notification for each one of the changes made to the contents of the file stored in the work file system, the notification indicating that the update file reflects all the changes of a version of the file; and at a predetermined time, distributing the update file over the data network to a receiver work file system.

40. A computer readable medium comprising a computer program for distributing content in a data network, by performing the steps of:

monitoring a work file system to determine if a file is created and stored in a work file system;

receiving a request to create a file in the work file system;

in response to the receipt of the request, generating a system call to create the file;

creating and storing the file in the work file system;

generating a notification that the file has been created and stored in the work file system;

at a predetermined time, distributing a copy of the file over the data network to a receiver work file system;

monitoring the contents of the file to track changes made to the contents: and at another predetermined time, distributing a copy of the file over the data network to the receiver work file system if a change to the contents of the file has been observed.

* * * * *